United States Patent [19]

Anderson et al.

[11] 3,925,668
[45] Dec. 9, 1975

[54] SPECTRAL SENSOR AND METHOD
[75] Inventors: Norman C. Anderson, Morris Island, Chatham; Robert E. Rupert, South Dennis, both of Mass.
[73] Assignee: F-S Inc., South Dennis, Mass.
[22] Filed: Mar. 25, 1974
[21] Appl. No.: 454,318

[52] U.S. Cl. .................. 250/351; 250/338; 324/96
[51] Int. Cl.² ........................................ G01J 1/04
[58] Field of Search ............ 250/336, 338, 347, 351, 250/514; 324/80, 96

[56] References Cited
UNITED STATES PATENTS

| | | | |
|---|---|---|---|
| 2,214,621 | 9/1940 | Leishman | 250/514 |
| 3,035,175 | 5/1962 | Christensen | 250/347 |
| 3,068,408 | 12/1962 | Lovegrove | 324/96 X |
| 3,277,300 | 10/1966 | Kerr et al. | 250/351 |
| 3,398,281 | 8/1968 | Treharne et al. | 250/338 |
| 3,502,874 | 3/1970 | Astheimer | 250/347 X |
| 3,508,053 | 4/1970 | Dimeff | 250/351 |
| 3,717,772 | 2/1973 | Engman | 250/347 X |

*Primary Examiner*—Archie R. Borchelt
*Attorney, Agent, or Firm*—Alfred H. Rosen; Frank A. Steinhilper

[57] ABSTRACT

A spectral sensor operating with a radiation sensitive detector employs a pulsed signal. A chopper is interposed in the radiation path comprising a needle of a moving needle meter whose needle is restrained at its tip. An alternating current applied to its coil causes the needle to vibrate, alternately exposing and blocking the detector. The sensor is low cost, and sensitive enough to respond to a temperature differential between a normal area and an inflamed area of a human body. Operating ranges can be varied by adjustment of electrical circuits or by interchangeable filters.

2 Claims, 5 Drawing Figures

SPECTRAL SENSOR AND METHOD

BACKGROUND OF THE INVENTION

Temperature measuring devices, often known as sensors or pyrometers, have long been known. Such devices may operate from radiation as well as by contact. Radiation devices, however, are usually extremely expensive and often have only generalized sensitivity. There is a continuing need for improved spectral sensors characterized by economy of manufacture, sensitivity to small areas and small temperature differentials, and convenient use and operation.

Sensors operating from available detector materials generally require means to convert a steady d.c. output to an a.c. or other output capable of amplification, and such converters are often very bulky and expensive as well as inconsistent in result. A typical converter employs a moving disk or other circular or cylindrical member having slits therein. When such a device is rotated to interrupt impinging radiation, an amplifiable current can be generated, but the devices still have numerous drawbacks; they tend to be inaccurate because accuracy is dependent on constancy of speed of a motor, and there is a relatively heavy power consumption.

GENERAL NATURE OF THE INVENTION

The present invention is a small, light weight spectral sensor, which is conveniently small and very well suited to being held in the operator's hand. Its power consumption is compatible with battery operation as well as operation from an external power source. It is sufficiently accurate and sensitive to be capable of distinguishing and detecting an inflamed area of the human body or, in effect differentials in temperature of the human skin. Such use is, in fact, one contemplated use and application of the present invention.

The sensor in general is a device of a size to be hand held, being not much larger than a small transistor radio. An aperature in the front end admits radiant energy and directs it to a detector either directly or through optical filters. Positioned in the radiation path, and in front of the detector is a vibrating needle or the like. In a preferred embodiment, this needle is a part of an inexpensive commercially available meter or gauge whose needle has its moving tip anchored or weighted to prevent or reduce motion. An oscillator feeds alternating or pulsed current to the meter, causing the needle to vibrate, and as the needle vibrates across the faces of the detector it alternately exposes and at least partially blocks the detector surface to result in a pulsed detector signal. The signal is amplified and fed to an indicator or other measuring device. A reading indicating temperature is given by a suitable gauge, or by a chart or digital readout as desired.

Interchangeable filters may select a chosen operating range, and the device may record or measure any desired temperature up to many hundred or thousands of degrees. Without filtering, sensitivity is excellent in normal environmental ranges such as from about 0° to about 100°C.

The general nature of the invention is illustrated in further detail in the drawing in which.

DETAILED DESCRIPTION OF THE INVENTION

Figure 1:
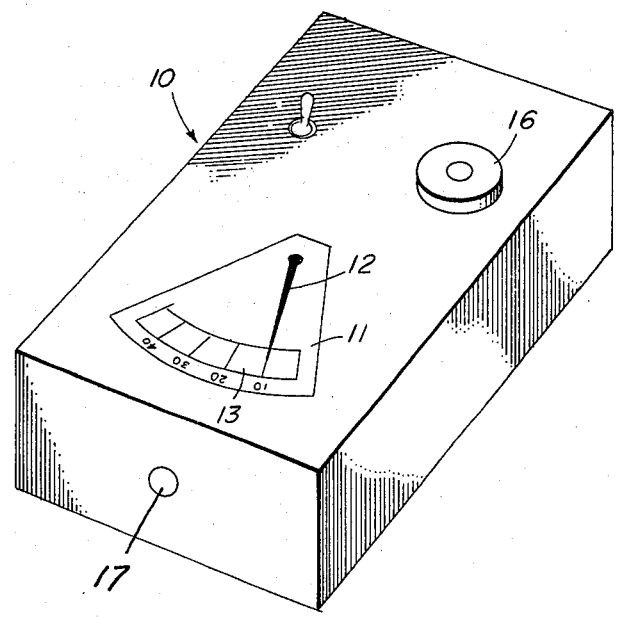
FIG. 1 is a perspective view of a hand held spectral sensor according to one embodiment of the invention.

In FIG. 1 is illustrated a spectral sensor generally designated 10 having a dial 13 on indicator 11 including a needle 12. An off/on switch 15 is mounted in a convenient position on the sensor as is a calibrating control 16. In the front end of the sensor 10 is a radiation aperture 17. In use and operation the spectral sensor 10 is mounted with detector 20 right behind aperture 17 so that the radiation enters the aperture and activates the detector as will be explained here in.

Figure 2:
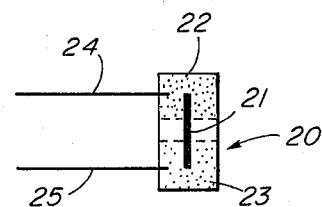
FIG. 2 is a front view of a detector suitable for the sensor shown in FIG. 1.

In FIG. 2 is shown a detector 20 having a radiation responsive strip or area 21 on its surface. In one specific embodiment as actually built and tested, the detector is an insulating support about one-fourth by about one-eighth inch and the radiation responsive strip of active sensing area is a layer of lead sulfide about 0.4mm. wide and about 0.6mm. long. To provide electrical contact with the sensitive area two thin layers of gold 22 and 23 are coated on portions of detector including at least the two ends of the strip detector material. Lead wires 24 and 25 are secured to the detector to make electrical contact with the gold layers 22 and 23.

Figure 3:
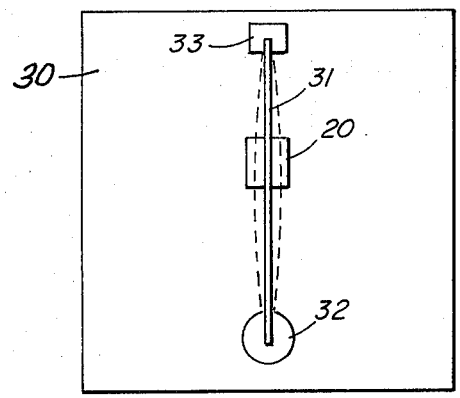
FIG. 3 is a diagrammatic front view of a chopper for the sensor of FIG. 1.

In FIG. 3 is shown the detector 20 mounted on a suitable panel or support 30 which is adapted to be positioned within the sensor 10 closely behind aperture 17. In front of the detector 20 is a needle or pointer 31. In practice, this needle 31 is in fact the indicator needle of a commercially available electrical meter or gauge. By means of a coil 32, the needle 31 is adapted to be moved across a dial. The measuring instrument or gauge may in fact be, but need not be, identical with the indicator 11 on the face of the sensor 10. The normally free end of needle 31 is secured to panel 30 by means of a clamp 33 or other fastening means so that when a signal or current is applied to coil 32 the tip of needle 31 is not free to move. Instead when such a signal is applied to coil 32 the needle 31 is bent. In the event that an alternating or oscillating current signal is applied to coil 32 the needle 31 will bend and may resonate at one or several frequencies. In practice, needle 31 does in fact have a number of natural resonance frequencies, one of which is approximately 300 Hertz. When a signal of approximately 300 Hertz is fed to coil 32 the needle vibrates and a portion of the needle near the middle of its length vibrates through a swing of approximately one-fourth inch much like a violin string tuned to 300 Hertz. In this manner, the needle is so positioned that it is adapted to vibrate across the face of detector 20, and two times for each vibration or each cycle, it blocks and un-blocks the detector from incident radiation.

Figure 4:
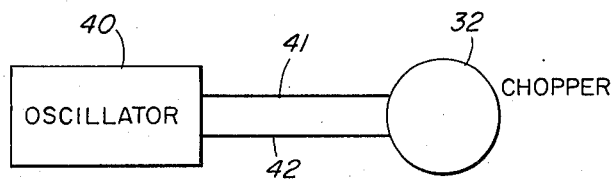
FIG. 4 is a block diagram of electrical circuitry for the sensor of FIG. 1.
Figure 4:
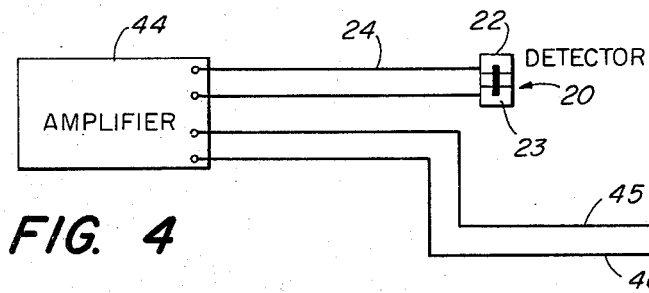

In FIG. 4, as illustrated in block diagram, is an electrical circuit suitable to operate the sensor 10 and operable from a self contained power source such as a disposable or rechargable battery, of from an external power source. An oscillator 40 which desirably is a variable or adjustable oscillator, is adapted to generate an electric signal which either fixed at, or adjustable to include, a frequency such as 300 Hertz or other working range of the sensor. This oscillator 40 feeds a signal through leads 41 and 42 to coil 32 of the moving coil galvanometer which operates needle 31 (see FIG. 3).

An amplifier 44 is connected to leads 24 and 25 which in turn are connected to terminals 22 and 23 of detector 20 (see FIG. 2). A signal generated by detector 20 accordingly is fed to amplifier 44, to produce a signal which is sufficiently powerful to operate indicator 11. The output of amplifier 44 is fed by means of leads 45 and 46 to indicator 11 where it is connected to a moving coil 47. Thus, in conventional manner an output signal from detector 20 is amplified to produce a reading on indicator 11.

The detector may be any suitable radiation sensing member capable of sensing a desired spectral range of radiation and producing an electric signal. Photo voltaic, photo conductive or pyroelectric detector are practicable. Various materials such as selenium, silicon materials, lead or cadmium componds can be used. A lead sulfide detector is presently employed although not necessarily presently preferred, and is quite effective, inexpensive, readily available, and easily produced in uniform quality.

Using a lead sulfide detector the sensor is well adapted to detecting a body or area at a temperature other than ambient, but the structure and mechanism broadly speaking will detect, measure or indicate any desired activating radiation.

The detector 20 has an active area 21 which is desirably quite small and relatively narrow, generally being about the same width as or even more narrow than needle 31, so that the needle can be vibrated across the detector surface completely blocking or shielding the detector from radiation at least once during its period of vibration. The needle 31 need not be wide enough to block the entire detector; all that is necessary is to have a sufficient difference between the blocked and unblocked positions so that the signal from detector 20 can be amplified. The detector actually used in one embodiment which has been built and tested has an active area about 0.4mm. × 0.6mm.; the needle 31 in the same device is about 0.4mm. wide.

Figure 5:
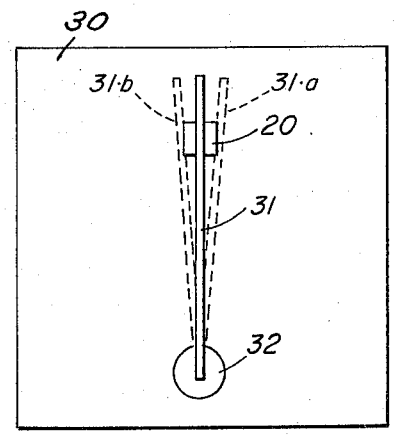
FIG. 5 is a diagrammatic front view of a chopper for the sensor of FIG. 1 according to another embodiment of the invention.

FIG. 5 illustrates another form of chopping mechanism suitable for a sensor according to this invention. A coil 32 and needle 31 of an electrical gauge or meter is mounted with the needle, when at rest, positioned in front of a detector 20. The needle 31 is optionally a conventional unmodified needle from a commercially available meter, or may if desired be modified by adding weight to the tip of needle 31. The needle 31 has a natural period of resonance such that it can swing rapidly back and forth between a first position 31a and a second position 31b. A desired period of resonance is achieved, if necessary, by weighing the tip of needle 31. If desired, one or several other periods of resonance may be employed by causing the needle to vibrate in halves, thirds, quarters or other modified periods or segments. In any case, the application of an oscillating signal to coil 32 causes a portion of needle 31 to pass rapidly back and forth across the face of detector 20.

Many variations are possible in the structure of the movable shied corresponding to needle 31. In a simple, low speed embodiment the needle may be moved across the face of detector 20 by a simple low frequency signal applied to coil 32 at a frequency far below the lowest resonant frequency of the shield. The shield can be weighed or contoured to set its period of motion slower or fasted. It can be spring - mounted, counter balanced or otherwise controlled and any or all of these modifications can still produce a signal capable of being amplified.

We claim:

1. A radiation sensor for detecting and indicating temperature responsive radiation comprising a radiation sensitive detector means enclosed within a case and adapted to generate an electric response to radiation, an aperture associated with said detector means and positioned to admit radiation and to direct radiation to said detector, a flexible shield positioned between said aperture and said detector, said shield having a mechanically resonant frequency of vibration and being so positioned that it is adapted to vibrate into and out of a shielding position in which is interrupts radiation from said aperture, means to generate a periodically varying electric signal at said resonant frequency, means responsive to said signal to flex said shield whereby said shield is caused to vibrate at a resonant frequency, and means responsive to electric output of said detector means to denote the presence of activating radiation impinging on said detector means.

2. In a radiation sensor wherein radiation impinges on an electro responsive detector, means for chopping said radiation into pulses comprising a narrow radiation sensitive area comprising the active area of said detector, means to direct radiation onto said active area, a shield positioned to intercept said radiation and capable of being vibrated at a mechanically resonant frequency into and out of a radiation intercepting position, electro responsive flexing means adapted to flex said shield in response to an electric signal, and an oscillator tuned to said resonant frequency and adapted to feed an oscillating frequency to said electro responsive flexing means.

* * * * *